Sept. 12, 1933.  O. J. GREGG  1,926,673
DOOR TRIM AND MEANS TO DETACHABLY SECURE THE SAME IN PLACE
Filed Oct. 18, 1932  2 Sheets-Sheet 1
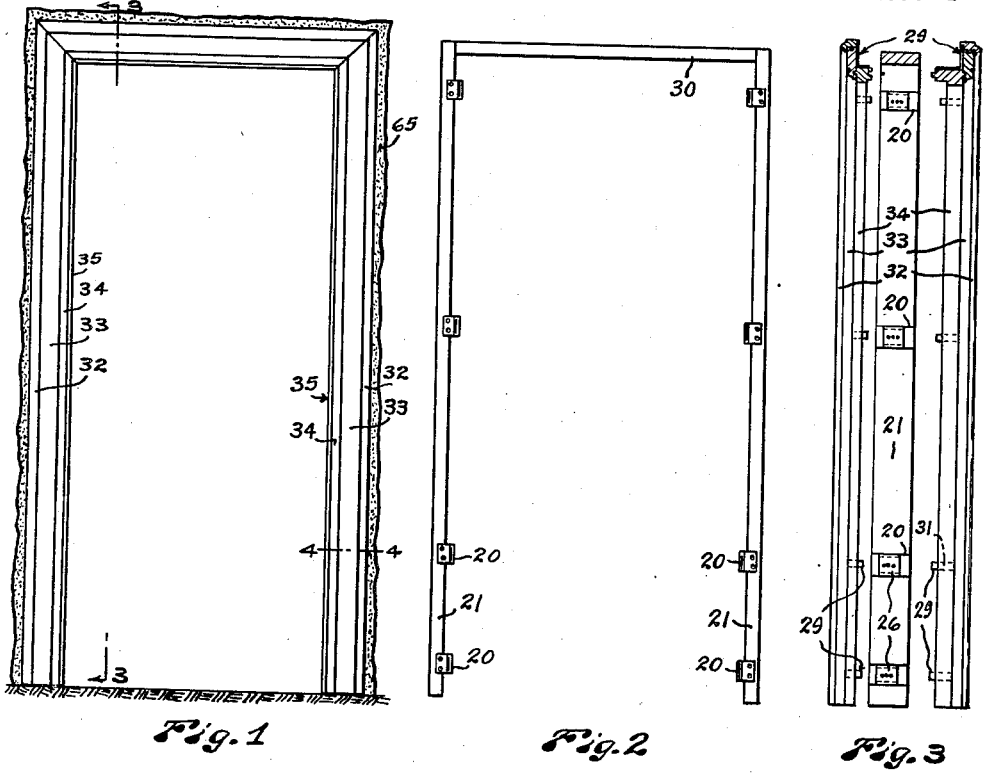
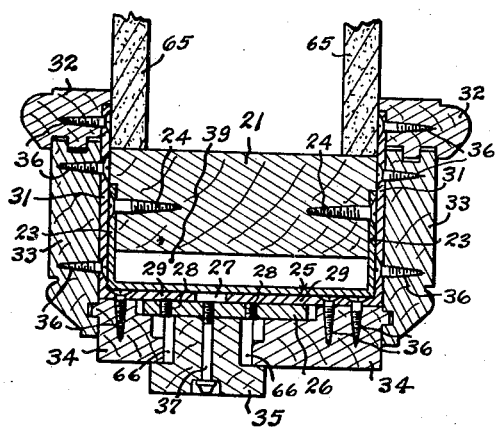
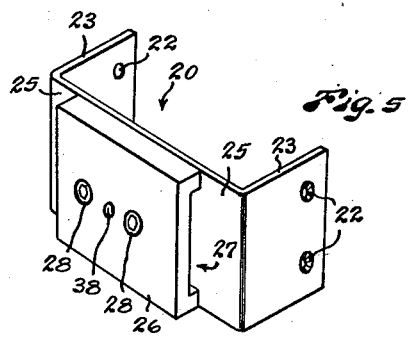
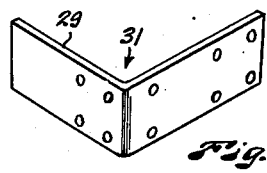
INVENTOR
Okey J. Gregg
BY
ATTORNEY Sept. 12, 1933. O. J. GREGG 1,926,673
DOOR TRIM AND MEANS TO DETACHABLY SECURE THE SAME IN PLACE
Filed Oct. 18, 1932  2 Sheets-Sheet 2
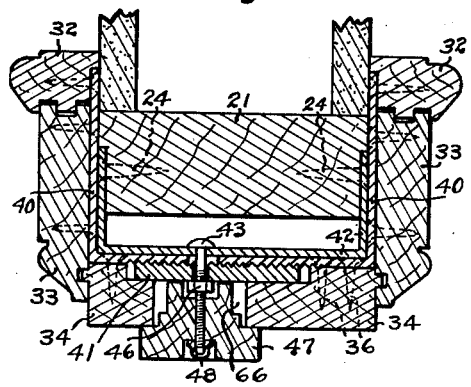
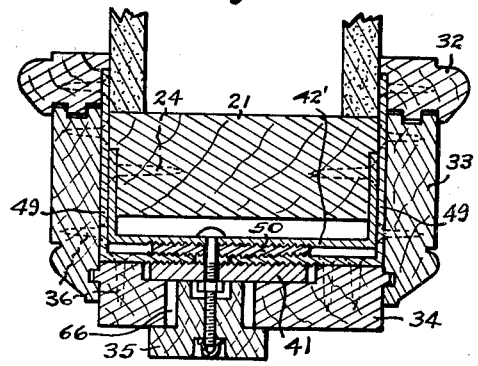
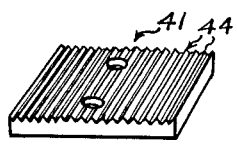
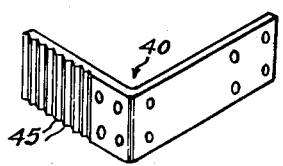
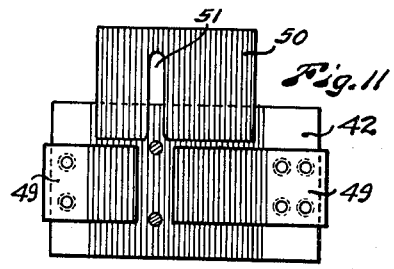
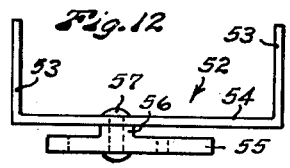
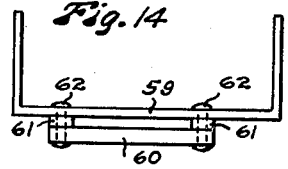
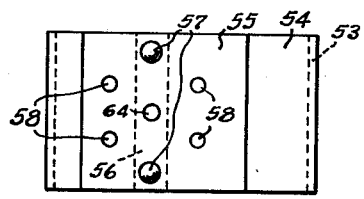
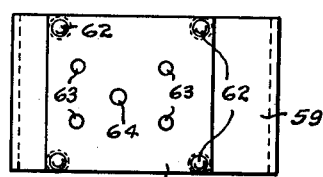
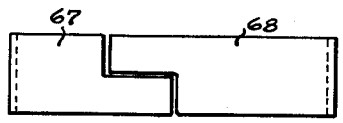
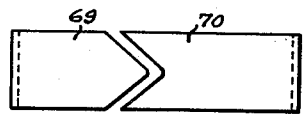
INVENTOR
Okey J Gregg
BY
ATTORNEY Patented Sept. 12, 1933

1,926,673

UNITED STATES PATENT OFFICE 1,926,673

DOOR TRIM AND MEANS TO DETACHABLY SECURE THE SAME IN PLACE

Okey J. Gregg, Seattle, Wash.

Application October 18, 1932. Serial No. 638,295

15 Claims. (Cl. 20—11)

My invention relates to building construction, and particularly relates to trim to be used around doors, windows, and in similar places where like problems exist.

It is an object of my invention to secure either wood or metal trim and the door jamb in place by means which are readily accessible, and which means will permit a ready installation or removal of the trim. It is also an object to provide trim securing means which are not visible after the work is completed.

Heretofore, around commercial buildings, hotels, apartments, and residences, it has been the practice to install a trim, particularly a wooden trim, with screws or nails which are driven or secured through the trim to the door buck. It is necessary to move when alterations are made, and in this work, damage generally results to the surface of the trim around the trim securing means which extend to the surface, thereby necessitating redecoration of the trim when the same is used on other locations. It is one of my objects to provide a trim which may be readily removed without injury or marking in any way to the surface of the trim, which trim when sesured in place provides sufficient support for the door against the usual rough usage to which it is subjected.

Also, heretofore in the construction of buildings, one part of the work which has delayed the completion of the building and has afforded great damage to the contractors, because of the usual time requirements, is the work of installing the trim and the doors. This delay is inherent in the fact that the installation of the trim is one of the last pieces of work to be done and therefore cannot be undertaken until after the various artisans have accomplished their work, and any delay of any of these various artisans requires that the commencement of the installation of the doors and trims be delayed to this extent. In order to overcome this difficulty, many attempts have been made to provide a trim which may be rapidly installed. However, these various attempts have signally failed bacause of the great cost of the trim, and because of the fact that the securing means were only semi-permanent in nature.

Another object of my invention is to provide a trim which may be partially assembled and completely decorated away from the site of the building operations and installed in a short period of time in the building.

It is also an object of my invention to provide an anchor means which is adjustably secured to the door buck, and to provide means to detachably secure the trim and door jamb to such anchor means.

It is a further object of my invention to provide a door trim in two pieces which may be readily secured to anchor means attached to the door buck and thereafter readily removed.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a view in elevation of my combination door trim and jamb installed to a buck.

Fig. 2 is a view in elevation of the door opening formed by the buck and having my U shaped anchor members in place.

Fig. 3 is a view taken substantially on line 3—3 of Fig. 1, showing the two parts of the combination trim backed away from the buck, for purpose of illustration.

Fig. 4 is a sectional view on a larger scale substantially on line 4—4 of Fig. 1.

Fig. 5 is a detached view in perspective of the substantially U shaped anchor member illustrated in Fig. 4.

Fig. 6 is a view in perspective of an angular corner member illustrated in Fig. 4.

Fig. 7 is a sectional view of a modified form of holding means, said view being similar to Fig. 4.

Fig. 8 is a view in perspective of an angle member, with a serrated surface, used in Fig. 7.

Fig. 9 is a view in perspective of the plate member, with a serrated surface, used in Fig. 7 and in Fig. 10.

Fig. 10 is a sectional view of another modified form of holding means, said view being similar to Fig. 4.

Fig. 11 is a front elevation of parts shown in Fig. 10, showing the filler plate raised above its normal operative position, the plate member shown in Fig. 9 being removed.

Fig. 12 is a plan view of a modified form of a substantially U shaped anchor member to be used as an alternative for the member shown in Fig. 5.

Fig. 13 is a view in elevation of the parts shown in Fig. 12.

Fig. 14 is a plan view of another modified form of a substantially U shaped anchor member.

Fig. 15 is a view in elevation of the parts shown in Fig. 14.

Fig. 16 is a view in elevation of a modified form of angle members shown to be used as alternatives for the members shown in Fig. 6, this view showing a pair of said angle members.

Fig. 17 is a view in elevation of another modified form of the angle members, this view also showing a pair of said angle members.

A plurality of substantially U shaped anchor members, indicated generally by 20 (see Fig. 5), are secured to the respective side bucks 21 and preferably such securing is accomplished by means of holes 22, which holes are positioned in the leg members 23 of the U shaped anchor members 20. It is preferable that the securing of the U shaped anchor members 20 to the buck 21 be accomplished by screws 24, passing through the holes 22 into the bucks 21 as the bucks 21 are, what is generally known as, rough bucks. These bucks are installed and are generally not in an exact vertical position, and by engaging the U anchor members 20 in this manner, the U anchor members 20 may be plumbed so that an exact vertical line is had between the respective edges 25 of the U shaped members. Secured to the face 25 of the U shaped member 20 is a member 26, which member 26 is provided with a cutaway portion, so that a slot 27 is provided between the members 25 and 26. Set screws 28 are threaded in member 26, so that such screws may be turned and engage the leg members 29 of the angle members 31, one of which is shown in Fig. 6, after the leg member 29 is inserted into the slot 27. It is preferable that the set screws 28 be of a form so that when they are tightened they will be flush with the surface 26. There are many well known set screws on the market which are so constructed, but I preferably employ the set screws shown having an opening therein, the walls of which opening are positioned to form a hexagon, and which set screw is adjusted by means of a tool member of a hexagon cross section.

The number of U shaped anchor members 20 to be connected to support the trim and door jamb may vary, however in commercial practice I have found that four members on each side buck 21 are sufficient. Obviously, to obtain more strength it is only necessary to provide additional U shaped anchor members 20 upon the respective side bucks 21, and U shaped anchor members 20 may be provided on the top buck 30.

A plurality of the angle members 31 (see Fig. 6) connect the various members 32, 33, and 34 together to form a trim unit, which may be done by means of screws 36 as shown. This is preferably done at the factory, and the trim is delivered to the job in two pieces, which pieces are shown in Fig. 3, somewhat backed away from the buck. Each of these trim units comprises two side parts and a head part. The door jamb 35, which is not herein referred to as a part of the trim, is installed in place, as hereafter described.

In Figs. 1, 2, and 3 there are no U shaped anchor members 20 connected to the top buck 30, and the cross section of the top trim, as indicated in the upper part of Fig. 3, shows angle members 29 connecting the various parts of the trim together, and the trim used over the top buck is therefore somewhat modified. As each unit is installed in place, the leg members 29 of the angle members 31 enter slots 27, and the two units of the trim are secured in place by tightening set screws 28. It is preferable that the slot 27 be wider than the width of the leg member 29. This provides clearance and permitting for insertion of the angle members 31 in the anchor members 20, even though the anchor members are not accurately positioned vertically of the buck.

After the two trim units are installed, the jamb 35 completes the trim and is secured in place by means of screws 37, which are tightened in threaded holes 38, which holes 38 are positioned in the anchor members 20.

It is to be noted that the screws 36, connecting the various members 32, 33, and 34, to the angle member 31 to form one unit of the trim, are inserted from the inner side, so that no mar or mark is placed on the external and finished surface of the trim in assembling or in disassembling the same. It is preferable that the holes through the jamb 35, through which the screws 37 are inserted to secure the jamb in place, be made on the job, so that alignment between these holes and the holes 38 in the anchor members is had. In the cross section shown in Fig. 4, a space 39 between the buck 21 and the faces 25 of the U shaped members 20 is shown. This space affords the adjustment which may be necessary to line up the U shaped members 20, due to the inaccuracy in lining up the rough bucks 21.

In Figs. 7, 8, and 9 I have shown a modified form where serrated faces are used on one face of the angle member 40 and on one face of the plate 41. In this modified form bolts 43 extend through the U shaped anchor member 42. The angle members 40 secure the various members 32, 33, and 34 together to form one unit of the trim, similar to the manner in which they were secured to form the trim shown in Figs. 1 to 4. The respective angle members 40, carrying the two units of the trim are inserted in place, similar to the manner of their insertion in the form shown in Figs. 1 to 4. Thereafter the plate 41 is inserted over bolts 43, so that the serrated teeth 44 of the plate 41 engage the serrated teeth 45 of the angle members 40. Nuts 46 are then tightened, securing the plate 41 in place, and in turn the angle members 40 and the trim connected with such angle members 40. The bolts 43 preferably extend outwardly, so that the jamb 47 may be secured in place by the use of nuts 48.

In Figs. 10 and 11 I have shown another modified form using serrations to prevent movement between the anchor members and the angle members. The anchor member 42' in Fig. 10 is identical with the anchor member 42 in Fig. 7, except that serrations are provided on one surface of the member 42'. The angle members 49 in Fig. 10 are serrated on both faces. The plate 41 in Fig. 10 is similar to the plate 41 in Fig. 7. When angle members 49 are used, having serrations on both surfaces, a filler member 50 having serrations on both surfaces is preferably used. As the two units of the trim are installed in place, the angle members 49 will readily slide by the anchor member 42', as a space equal to the thickness of filler member 50, is provided therebetween. After angle members 49, carrying the respective trim units, are installed in place, the filler member 50 is slid downwardly, from the position indicated in Fig. 11, between the anchor member 42' and the angle members 49. There will be sufficient room to insert the filler member 50 between the trim units, then to turn the filler member 50 into the position shown in Fig. 11, and then to drop the same down into place.

The filler member 50 is preferably in the form shown having a slot 51 to limit downward movement of the filler member. Obviously, other forms of filler members and other stop means may be used, the above only setting forth one form which may be used.

In Fig. 12 I have shown a modified form of an anchor member which may be substituted for the anchor member shown in Fig. 5. This anchor member is substantially U shaped and formed of leg members 53 and a face member 54. Another member 55 is secured to the face member 54 and spaced therefrom by spacer member 56. The members 55 and 54 may be secured together as by rivets 57. Threaded holes 58 are provided in member 55 for the reception of set screws, such as the screws 28 shown in Fig. 5.

In Fig. 14 I have shown another modified form of anchor member interchangeable with the anchor member shown in Fig. 5. This anchor member comprises a U member 59 and a face member 60, which are spaced apart by spacer members 61. The face member 60 and U member 59 may be secured together as by rivets 62. Threaded holes 63 are provided for the insertion of set screws, such as set screws 28. In the alternative construction shown in Figs. 12 and 13 and in Figs. 14 and 15, a threaded hole 64 may be provided for the reception of a bolt 37.

In the use of my device the various anchor members shown are designed so that the space between the two leg members is substantially equal to the width of the buck upon which the anchor is to be fitted. In case that the trim is used upon variable size walls, the buck may be trimmed down so that the anchor member will fit the same or another size anchor member may be used. The leg 29 of the angle member 31, which angle member carries one section of the trim, may be inserted to the proper depth in the slot 27, so that the trim will fit flush with the wall 65. It is clear that as the trim is used upon walls of varying thickness, that the space between the trim, into which is inserted the jamb 35, will vary. It is to be noted that the jamb 35 has an overhanging portion and a space 66 is provided on either side between the jamb and the trim. This space will permit adjustment and the same trim may be used upon walls varying in thickness in a distance approximating an inch, when the trim is used as designated in the drawings. To provide wider adjustment, it is advisable that the overhanging edges of the jamb 35 be increased and the space 66 be likewise increased.

The modified forms of the angle member 31 which I have illustrated in Figs. 16 and 17, set forth angle members which are fitted in pairs and which will permit greater adjustment of the angle members when used with anchor members such as illustrated in Fig. 5 and in Figs. 14 and 15. In Fig. 16 the inner ends of the angle members interfit and permit greater longitudinal movement of the leg portions of the angle members. In this view the leg members 67 and 68 of the angle members each have a corner removed and the members interfitted. In Fig. 17 leg members 69 and 70 of the angle members are provided with a still further modified form. In this view the leg member 69 is tapered to a point, and the leg member 70 is cut away to interfit with the point of leg member 69.

From the foregoing, it is apparent that I have disclosed a device which provides anchor members which are preferably attached to the rough buck from the side to permit ready adjustment of the anchor members. Furthermore, I have provided various faces upon the anchor members permitting ready connection between the anchor members and the members carrying the trim. In this connection it should be noted that my trim may be partially assembled away from the building, and decorated so that the workman upon the job can readily and rapidly install the trim, thereby preventing the usual delay. Furthermore, my angle members unite the various members of the trim into two units, so that I am able to install wooden or metal trim in two units, and which trim permits the ready installation of the door jamb after the trim has been installed. The trim and door jamb may be quickly and easily dis-assembled without marring or damaging the trim, and then assembled in another location.

Obviously, changes may be made in the forms, dimensions, and arrangement of the parts of my invention, without departing from the principle thereof, the above setting forth only preferred forms of embodiment.

I claim:

1. A door frame comprising two units of substantial L shape in cross section, each unit being provided with projecting metal members; a door buck; an anchor member secured to said buck, said anchor member being provided with a recess positioned to receive therein said projecting metal members; means detachably securing said projecting metal members within said recess in the anchor member; and a door jamb member detachably secured in a position covering the connection between the two members of substantially L shape in cross section.

2. A door frame comprising two units of substantial L shape in cross section, each unit being provided with projecting metal members; a door buck; a substantially U shaped anchor member having its leg members secured to opposite sides of said buck; means, carried by said anchor member, positioned to receive said projecting metal members; and means securing said projecting metal members to said anchor member.

3. A door frame comprising two units of substantial L shape in cross section, each member being provided with projecting metal members; a door buck; a substantially U shaped anchor member having its leg members secured to opposite sides of said buck, said U shaped anchor member being provided with a recess positioned to receive therein said projecting metal members; and means securing said projecting metal members in said recess in the anchor member.

4. In a door frame of the character described an upright buck; a plurality of substantially U shaped anchor members secured to said buck; a plurality of pieces forming a trim unit; angle brackets securing the several pieces of the trim unit in assembled relation; and devices releasably securing said angle brackets to said anchor members.

5. In door frame holding means, a door buck; an anchor member secured to said buck; a holding member carried by said anchor member; trim supporting member adapted to engage said holding member; and means detachably engaging said trim supporting members and said holding member.

6. In door frame holding means, a door buck; an anchor member secured to said buck, said anchor member having slot forming means; trim supporting means telescopically positioned within the slot formed by said slot forming means; and means detachably securing said trim supporting means within said slot.

7. A door frame holding means comprising a substantially U shaped anchor member adapted to receive a door buck between its opposite leg members; a holding member carried by said anchor member; and trim supporting members secured in said holding member.

8. A door frame holding means comprising a substantially U shaped anchor member adapted to receive a door buck between its opposite leg members; another member carried by said anchor member and positioned in spaced apart relation with respect to the outside face of the central member of said anchor member and providing therebetween a slot; and trim supporting members secured in said slot.

9. A door frame holding means comprising a door buck; a plurality of substantially U shaped anchor members having two spaced apart leg portions positioned on opposite sides of the buck, whereby the face portions of said anchor members may be supported in spaced relation from said buck; and means securing the leg portions of said anchor members to said buck, whereby the face portions of said anchor members may be selectively positioned in a common plane.

10. In a door frame holding means, a door buck; an anchor member secured to and extending across the door face of said door buck, said anchor member having means provided with a serrated surface face, which face is parallel to the door face of the buck; a trim supporting member having a serrated surface engaging the serrated surface of the anchor member means and means holding said two serrated surfaces in engagement.

11. In door frame holding means, a door buck; an anchor member secured to said door buck, said anchor member having an adjustable plate member provided with a serrated surface; a trim supporting member having a serrated surface engaging the serrated surface of said anchor plate member; and adjustable means securing said two serrated surfaces in engagement.

12. In a door frame holding means, a door buck; an anchor member secured to said door buck, said anchor member having a substantially plane surface and a spaced apart adjustable plate member provided with serrations on the surface adjacent the said plane surface; a trim supporting member having a serrated surface engaging the serrated surface of said anchor plate member; and adjustable means securing said two serrated surfaces in engagement.

13. A door frame comprising a door buck; an anchor member secured to said buck; two units of substantial L shape in cross-section, each unit being provided with metal members projecting toward each other and projecting across the anchor member parallel to the door face of the buck; holding means, carried by said anchor member and positioned upon the door face of the buck, which holding means is positioned to receive said projecting metal members; and means securing said projecting metal members to said holding means.

14. A door frame comprising a door buck; an anchor member secured to said buck; two units of substantial L shape in cross-section, each unit being provided with metal members projecting across the anchor member parallel to the door face of the buck; holding means, carried by said anchor member, including a recess positioned upon the door face of the buck, which recess is positioned to receive said projecting metal members; and means securing said projecting metal members within said recess in said anchor member.

15. In a door frame holding means, a door buck; an anchor member secured to said door buck, said anchor member having an adjustable plate member; a trim supporting member having a projecting metal member engageable with a face of said anchor plate member; and adjustable means securing said plate and said trim supporting member in said engagement.

OKEY J. GREGG.